United States Patent

Nauth et al.

[11] Patent Number: 5,431,931
[45] Date of Patent: Jul. 11, 1995

[54] METHOD FOR MANUFACTURE OF LOW FAT PASTA FILATA CHEESE

[75] Inventors: K. Rajinder Nauth, Wheeling; David K. Hayashi, Chicago, both of Ill.

[73] Assignee: Kraft Foods, Inc., Northfield, Ill.

[21] Appl. No.: 190,305

[22] Filed: Feb. 2, 1994

[51] Int. Cl.⁶ .......................................... A23C 19/068
[52] U.S. Cl. ...................................... 426/36; 426/40; 426/42; 426/43; 426/582; 426/588
[58] Field of Search .................... 426/36, 40, 42, 43, 426/582, 588

[56] References Cited

U.S. PATENT DOCUMENTS

| | | | |
|---|---|---|---|
| 939,138 | 11/1909 | Just et al. | 426/36 |
| 3,998,700 | 12/1976 | Reinhold et al. | 426/36 |
| 4,226,888 | 10/1980 | Sieker | 426/36 |
| 4,243,684 | 1/1981 | Pruss et al. | 426/40 |
| 4,621,058 | 11/1986 | Reddy | 435/253 |
| 4,622,304 | 11/1986 | Reddy | 435/253 |
| 4,965,079 | 10/1990 | Hose et al. | 426/43 |
| 5,098,721 | 3/1992 | Kosikowski et al. | 426/61 |

*Primary Examiner*—Helen Pratt
*Attorney, Agent, or Firm*—Fitch, Even, Tabin & Flannery

[57] ABSTRACT

A method for manufacture of pasta filata cheese from skim milk or fat reduced milk having less than about 2% fat. A culture is added to skim milk and the skim milk is fermented to provide a cultured skim milk. The cultured skim milk is dried to provide a dried cultured skim milk. The dried cultured skim milk is rehydrated by mixing the dried cultured skim milk with water. The rehydrated cultured skim milk is added to non-cultured milk having less than about 2% milk fat in a cheese vat to provide a pasta filata cheese substrate. The pasta filata cheese substrate is then used to make pasta filata cheese by any of the conventionally known methods.

14 Claims, No Drawings

METHOD FOR MANUFACTURE OF LOW FAT PASTA FILATA CHEESE

FIELD OF THE INVENTION

The present invention relates generally to a method for manufacture of a low fat pasta filata cheese from skim milk or low fat milk having less than about 2% fat. More particularly, the present invention is directed to the manufacture of low fat or non-fat pasta filata cheese which is pliable and which has improved properties with respect to stretch when cooked.

BACKGROUND OF THE INVENTION

Pasta filata cheese, particularly mozzarella cheese, is one of the growing categories of cheese. It is primarily used in cooking and is the preferred cheese for pizza due to the stretchiness associated with pasta filata cheese when such cheeses are heated. Pasta filata cheeses are also used as a snack food in the form of short sticks, popularly called "string cheese". Regular full fat mozzarella cheese is medium firm with a clean, slightly acid cheese flavor. The cheese melts and becomes stringy upon cooking. When fat is removed from milk and the mozzarella cheese produced therefrom contains less than about 6% fat, the cheese becomes dry, firm, inelastic, does not flow when melted and has poor stretch qualities.

A conventional method for the manufacture of pasta filata cheese, such as mozzarella, is described in Kosikowski, F., "Cheese and Fermented Milkfoods", 1966, Edwards Brothers, Inc., Ann Arbor, Mich., pp. 162–167. In the method described by Kosikowski, standardized milk is pasteurized and cooled to a temperature of about 90° F. A starter culture is added with sufficient rennet to coagulate the milk in about thirty minutes. The resulting coagulum is cut to provide pieces of curd in whey. The cut curds are set in the warm whey for about 15 minutes with periodic gentle agitation. The curds in the whey are pushed to the back of the vat and the free whey is removed from the vat. Whey removal is slower than that for cheddar cheese because of a lack of cooking and the acidity. As the whey departs, the curds are packed gently together. The large curd packs are cut into blocks to effect quicker cooling. The curd blocks are rinsed with cold water and immersed in cold water. The cold water is drained after 15 minutes and the curds are bundled into clean cheese cloth to make 45 to 60 lb. bundles. The curd bundles are placed in a chill room (40° F.) to effect further draining of curd. The whey drains from the curd bundles overnight in the chill room. The curd, at this point, is referred to as raw curd. The drained curd bundles are removed from the chill room and acid ripening is commenced by exposing the drained curd bundles to warmer room temperatures for a period of at least one day. The curd bundles are removed from the warm room after complete drainage and after the curd pH decreases to a level of 5.2 to 5.4.

The cloth is removed from the acidified raw curd and the curd bundle is chopped into small pieces. these pieces are placed in hot water or hot whey at a temperature of about 180° F. in a mechanical blender. The hot water covers all the curd by a few inches. The curds are left in the hot water for a few minutes but not long enough for them to exceed a temperature of 135° F. A gentle molding agitation is then started with a mechanical apparatus which is used to pull and stretch the raw curd into a smooth, white plastic mass. The hot plastic mass is packed into suitable molds. Later, the cheeses are immersed in a salt brine for a period of about 24 hours. The cheese is then dried in air and is wrapped and packaged for shipment.

Numerous attempts have been made to provide improved methods for the manufacture of pasta filata cheese wherein the working and stretching of the raw curd is supplanted by continuous mechanical methods. U.S. Pat. No. 3,692,540 to Mauk describes a method for the manufacture of pasta filata cheese wherein the curd is held in whey to acid condition the curd. The curd is held until the acidity of the whey is from 0.25 to 0.30%. The raw curd is divided into pieces and the curd pieces are heated without working in a process cheese cooker to a temperature of 130°–160° F. The method of the Mauk patent utilizes a final direct heating step without working or stretching the cheese curd.

U.S. Pat. No. 3,117,008 to Mauk teaches a method for the manufacture of pasta filata-type cheeses wherein final curd texture is achieved by curing the curd for a period of time sufficient to provide a cheese having a smooth and continuous texture. In the method, a pasta filata curd, which includes acid-producing agents, is cooked at a temperature below that at which the acid-producing agents are substantially inactivated. Thereafter, the curd is leached to remove acid and provide an acidity of less than about 0.8%. The curd is then pressed and the pressed curd is subjected to vacuum conditions to close the curd. Thereafter, the curd is cured and the curing process provides a cheese having a smooth and continuous texture through the development of acidity by the acid-producing agents.

U.S. Pat. No. 3,531,297 to Kielsmeier, et al. is directed to a process for making pasta filata cheese wherein pasta filata cheese curd is subjected to particular treatment to make it more suitable for the steps of the pasta filata cheese-making process which follow cheddaring, including heating the curd particles by contact with heated water to a temperature in the plastic temperature range of the curd while mixing and stretching the curd. The Kielsmeier, et al. patent teaches that the mixing and stretching may be continued under superatmospheric pressure while forcing the curd through a restricted backpressure-creating outlet.

U.S. Pat. No. 4,898,745 to Zamzow, et al. is directed to a method for making pasta filata cheese from a pasta filata curd produced by any of the conventionally known methods. The curd is divided into pieces and the pieces are delivered to an auger conveyor. The curd is heated and worked in the auger conveyor to a plastic consistency as it passes through the conveyor. Plastic curd is transported through a steam injection heating zone and a static mixing zone to provide a homogeneous molten curd. The molten curd is transferred from the mixer through a holding conduit into a vacuum chamber so as to flash-cool the molten curd. The molten curd is pasteurized in the holding conduit to provide a pasta filata cheese with improved storage properties.

While any of the conventionally known methods described above can be used to produce a pasta filata cheese having desired melting and stretch properties from full fat milk or partially defatted milk, these methods have been found to be unsuitable to provide a pasta filata cheese from low fat or skim milk wherein the resulting cheese has less than about 6% fat.

Accordingly, it is an object of the present invention to provide a method for making pasta filata cheese. It is an another object of the present invention to provide a method for making pasta filata cheese from low fat milk or skim milk that retains the stretch properties associated with full fat or partially defatted milk having more than about 6% fat in the finished cheese.

SUMMARY OF THE INVENTION

The present invention is directed to a method for manufacture of pasta filata cheese from skim milk or fat reduced milk having less than about 2% fat. In the method, a culture is added to skim milk and the skim milk is fermented to provide a cultured skim milk. The cultured skim milk is dried to provide a dried cultured skim milk. The dried cultured skim milk is rehydrated by mixing the dried cultured skim milk with water. The rehydrated cultured skim milk is added to non-cultured milk having less than about 2% milk fat in a cheese vat to provide a pasta filata cheese substrate. The pasta filata cheese substrate is then used to make pasta filata cheese by any of the conventionally known methods.

In a further embodiment of the invention, a ropy culture is used in the pasta filata make procedure to further improve the properties of the low fat or nonfat pasta filata cheese manufactured by the method of the invention.

DETAILED DESCRIPTION OF THE INVENTION

In the method of the invention, skim milk is first pasteurized and is then cooled to a fermentation temperature of about 30° C. The skim milk is inoculated with from about 1000 to 1 million cells/ml. of an *S. lactis* culture. The inoculated skim milk is fermented over a period of about 14 to about 16 hours until a pH of from about 5.4 to about 4.2 is attained. The titratable acidity is in the range of from about 0.40% to about 0.85%. The consistency of the skim milk after fermentation is that of a thick coagulum. The fermented skim milk remains pumpable and may be fluidized by mixing.

Conventionally, mozzarella cheese and other pasta filata cheeses, are made with thermophilic lactic streptococci and lactobacilli. The curd produced during cheese making is cooked and stretched in water at about 150° F. The molten mass of curd is cooled and then brined to incorporate salt. Mozzarella cheese can also be made by using organic acids and acidulants, such as lactic acid, acetic acid, citric acid and glucono-deltalactone, without the use of cultures.

When fat is removed from milk, the resulting cheese is dry, firm, coarse and has little functionality as measured by meltability and stretchability. These characteristics are critical to the mozzarella cheese used in pizza and other cooking applications. The melt and stretch and some body and texture characteristics are believed to be a function of calcium content. When the protein (casein) concentration is high relative to fat, such as is the case in non-fat and low-fat cheeses, it is believed that the calcium is retained in the cheese as colloidal calcium. A higher calcium content is associated with poor melt and stretch of cheese. In accordance with the method of the present invention, the addition of a cultured skim milk to the milk used in the manufacture of cheese increases the acidity at the start of the make procedure and allows the cheese milk to equilibrate to a lower pH. Under these conditions, the concentration of ionic calcium increases at the expense of colloidal calcium. The ionic calcium follows the whey stream which is removed during the manufacture, thus lowering the total calcium retained in the cheese to provide the improved melt and stretch characteristics of mozzarella cheese which are provided by the method of the invention. Such improvement in melt and stretch characteristics are not provided by the direct addition of an acidulant, such as acetic acid or citric acid.

The addition of the cultured skim milk improves enzymatic activity of rennet on the casein of the noncultured milk used to make the cheese to such an extent that the amount of rennet can be reduced to one-half or one-third of the normal amount. The use of calcium chloride to improve rennet activity is not required. Also, the use of the cultured skim milk of the present invention in the make procedure reduces the cheese make time for mozzarella from a period of 4 to 5 hours to about 3 hours.

In accordance with the invention, a culture is added to skim milk and the skim milk is fermented to provide a cultured skim milk. The culture can be any of the lactic acid producing cultures normally used in the manufacture of cheese, such as *S. lactis, S. thermophilus* and any of the lactobacilli that metabolize lactose to provide lactic acid. The culture is added at a level of from about $10^3$ to about $10^8$ and the skim milk is fermented for a period of from about 4 to about 18 hours until a pH in the range of from about 4.2 to about 5.4 is attained. The cultured skim milk is then dried by any suitable method to provide a dried cultured skim milk. The preferred method for drying the skim milk is by spray drying. The dried cultured skim milk generally has a moisture level of less than about 5%. The moisture level is preferably in the range of from about 2% to about 4%. All percentages used herein are by weight unless otherwise indicated.

Prior to use in the method of the present invention, the dried cultured skim milk is preferably rehydrated by mixing the dried cultured skim milk with water or skim milk having about 9% non-fat milk solids. Rehydration may also be effected by adding the dried cultured skim milk directly to a cheese vat containing unfermented skim milk which is to be made into pasta filata cheese. It is preferred to have a relatively high level of solids in the mixture of dried cultured skim milk and water. Particularly preferred is the use of from about 10% to about 50% dried cultured skim milk solids and from about 90% to about 70% of water. The rehydration is preferably effected in a tank provided with agitation means. The dried cultured skim milk is preferably added to pasteurized skim milk having about 9% milk solids and about 0.1% milkfat while the skim milk is at a temperature of from about 45° F. to about 55° F. The rehydrated cultured skim milk at a solids level of 30% to 50% is very thick, but is easily pumpable when use is required. The rehydrated cultured skim milk is added to the non-cultured milk in the cheese vat at a level sufficient to provide 0.2% to about 3.0% of cultured skim milk solids based on the weight of the non-cultured skim milk.

In another embodiment of the invention, the non fat milk solids of the non-cultured milk in the vat are increased by adding non-fat dry milk to the milk in the vat. Preferably, the non-fat dry milk solids are rehydrated in water or skim milk to provide a non-fat milk solids substrate having from about 10% to about 50% of solids and from about 90% to about 70% of water. The non-fat dry milk solids are added to the non-cultured milk in the vat at a level sufficient to provide from about 0.2% to about 3.0% of non-fat dry milk solids based on the weight of the non-cultured skim milk.

After the rehydrated cultured skim milk and the rehydrated non-fat dry milk solids are added to the milk in the cheese vat, the milk is subjected to a pasta filata cheese manufacturing procedure. In all of the pasta filata cheese make procedures discussed hereinabove, a culture and rennet are added to the milk, the milk is set to provide a coagulum, the coagulum is cut to provide curd and whey, the curd is cooked in the whey, the whey is drained and the resulting curd is worked and stretched while immersed in heated water. In a further embodiment of the invention, a ropy culture is used as the fermenting culture in the manufacture of the pasta filata cheese, either by itself or in combination with a lactic acid producing culture.

Ropy or slimy milk of bacterial origin is well known in the dairy industry and is a condition that is usually sought to be avoided in cheese products, although certain dairy beverage products utilize ropy cultures. The ropiness may be evident only as a slightly abnormal viscosity or it may be so pronounced that the affected milk may be drawn out in fine threads, a yard long, and in some instances may assume a gel-like consistency. Ropy cultures may be developed from mesophilic cultures such as *S. lactis,* or thermophilic cultures, such as *S. thermophilus, L. bulgaricus* and *L. casei.*

The immediate cause of the ropy or slimy condition is the bacterial formation of gums or mucins. The gums are the more common cause. These are probably galactans produced by the fermentation of lactose and may contain varying ratios of galactose, glucose and rhamnose. Some of the active peptonizing bacteria produce sliminess by the formation of mucins, which are combinations of proteins with a carbohydrate moiety. The development of sliminess is closely associated with capsule formation. The ability to produce ropy milk by bacteria is readily acquired and lost by the bacteria.

The flavor of ropy milk, unless the effect is associated with a lactic fermentation, is indistinguishable from that of normal milk; nor is the milk unwholesome in any way. Nevertheless, the development of ropiness in raw milk is actively avoided in the cheese producing industry. Ropiness is generally considered to be a defect in milk because it makes processing difficult.

The following examples further illustrate various features of the invention, but are not intended to in any way limit the scope of the invention as set forth in the appended claims.

EXAMPLE 1

A cultured skim milk is prepared by adding a culture of *S. thermophilus* to pasteurized skim milk and fermenting the skim milk for 12 hours at a temperature of 100° F. The cultured skim milk is dried by spray drying to provide a dried cultured skim milk having about 3% moisture. The dried cultured skim milk is rehydrated by adding 171 pounds of the dried cultured skim milk to 969 pounds of pasteurized skim milk which is at a temperature of 40° F. and which has a non-fat milk solids level of 9.25% and a fat level of 0.1%. The mixture of cultured skim milk and pasteurized skim milk is agitated for 45 minutes with a propeller type mixer to form a 15% solids slurry and the slurry is permitted to stand for 8 hours at 40° F. to effect rehydration of the cultured skim milk.

17,000 pounds of skim milk that has been pasteurized and has a milk fat content of 0.1% is transferred to a vat. The rehydrated cultured skim milk is added to the pasteurized skim milk at a level sufficient to provide 1% of cultured skim milk solids based on the weight of the pasteurized skim milk. 32 pounds of cream, 525 grams of $TiO_2$, 10.5 mls of beta carotene, and 255 pounds of a starter culture of 50% ropy *S. thermophilus* and *L. bulgaricus* is added to the vat and after 60 minutes of ripening time, the pH is 6.22 and the total acidity is 0.23%. Single strength calf rennet (546 grams) is added and the vat is allowed to set for 30 minutes. The coagulum is then cut into ½ inch cubes. The curd is slowly stirred for 10 minutes before cooking. Heat is slowly added to the vat to increase the temperature to 104° F. to expel whey and excess moisture. After cooking the curds for 41 minutes, the pH has dropped to 5.26. The curds and whey are then pumped from the vat to a drain belt. On the drain belt, the curds knit together to form an even mat and moisture and whey are drained as it travels. The length of time that the curd is left on the belt is dependent on the activity of the microorganism. The pH of the curd should be 5.2 before reaching the curd mill. The curd is milled and the milled cheese curd is introduced into a twin auger conveyor which is mounted at an angle of 45° F. and which is filled with hot water at a temperature of about 175° F. The cheese curd which is 100° F. at the time of introduction to the auger has a solids content of 30.0%, a milk fat level of 1.0%, a pH of 5.2 and a salt content of 0.8%. The cheese curd pieces are heated to a temperature of 140° F. while being worked and stretched by the twin augers. The curd exits the auger and is formed into 20 pound blocks. The blocks are cooled and placed into a brine tank maintained at 45° F. The blocks exit the brine tank with a salt level of 1.44%. The finished pasta filata skim milk cheese has a moisture of 56.3%, butterfat of 1.5%, a salt level of 1.44% and a pH of 5.32.

What is claimed is:

1. A method for manufacture of non-fat pasta filata cheese from skim milk comprising;
    (a) adding a culture to skim milk and fermenting said skim milk to provide a cultured skim milk having a pH of from about 4.2 to about 5.4 prior to being dried;
    (b) drying said cultured skim milk to provide a dried cultured skim milk;
    (c) adding said dried cultured skim milk to noncultured milk having less than about 2% milk fat at a level sufficient to provide 0.2% to about 3.0% of cultured skim milk solids based on the weight of said non-cultured milk in a cheese vat to provide a pasta filata cheese substrate; and
    (d) subjecting said pasta filata cheese substrate to a pasta filata make process including the step of adding a starter culture to said non-cultured milk to provide a non-fat pasta filata cheese with improved stretch properties.

2. A method in accordance with claim 1 wherein said dried cultured skim milk has less than about 5% moisture.

3. A method in accordance with claim 1 wherein said culture that is used to ferment said skim milk in step (a) is selected from the group consisting of *S. lactis, S. thermophilus, L. casei* and *L. bulgaricus.*

4. A method in accordance with claim 1 wherein said dried cultured skim milk is rehydrated prior to adding said cultured skim milk to said non-cultured skim milk by mixing said dried cultured skim milk to an aqueous substrate selected from the group consisting of non-cultured skim milk and water.

5. A method in accordance with claim 4 wherein said cultured skim milk has from about 90% to about 70% of water.

6. A method in accordance with claim 1 wherein said pasta filata cheese is mozzarella.

7. A method in accordance with claim 1 wherein non-fat dry milk solids are also added to said non-cultured milk.

8. A method in accordance with claim 7 wherein said non-fat dry milk is added at a level of from about 0.2% to about 3% of non-fat dry milk solids based on the weight of said non-cultured skim milk.

9. A method in accordance with claim 7 wherein said non-fat dry milk is rehydrated prior to addition of said non-cultured milk.

10. A method in accordance with claim 9 wherein said non-fat dry milk is rehydrated by mixing said non-fat dry milk with skim milk.

11. A method in accordance with claim 1 wherein said non-cultured milk is skim milk.

12. A method in accordance with claim 1 wherein said pasta filata cheese produced by said method has less than about 2% fat.

13. A method in accordance with claim 1 wherein said non-cultured milk has from about 0.5% to about 2% of milkfat.

14. A method in accordance with claim 1 wherein a ropy culture is used in said pasta filata make process.

* * * * *